Patented Aug. 10, 1926.

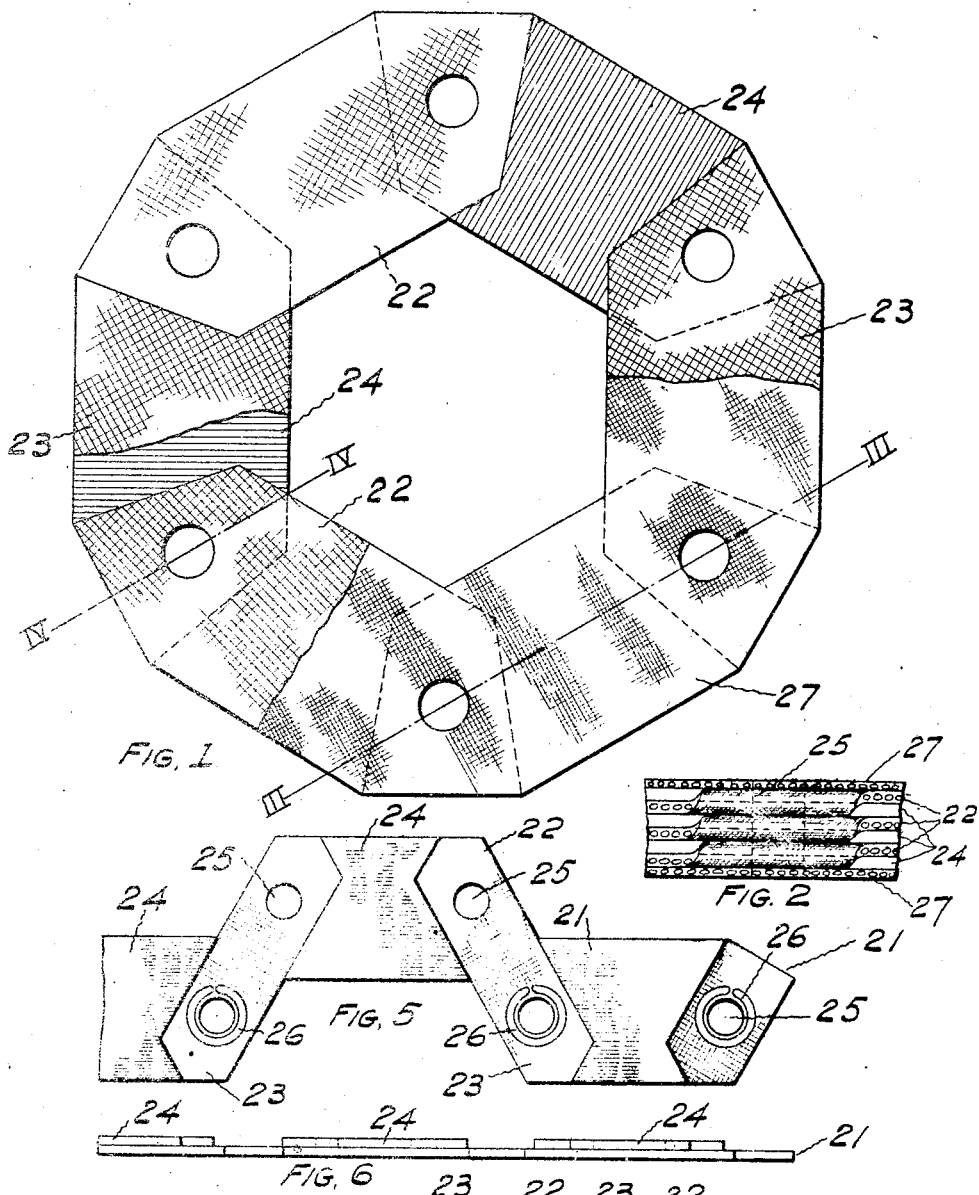

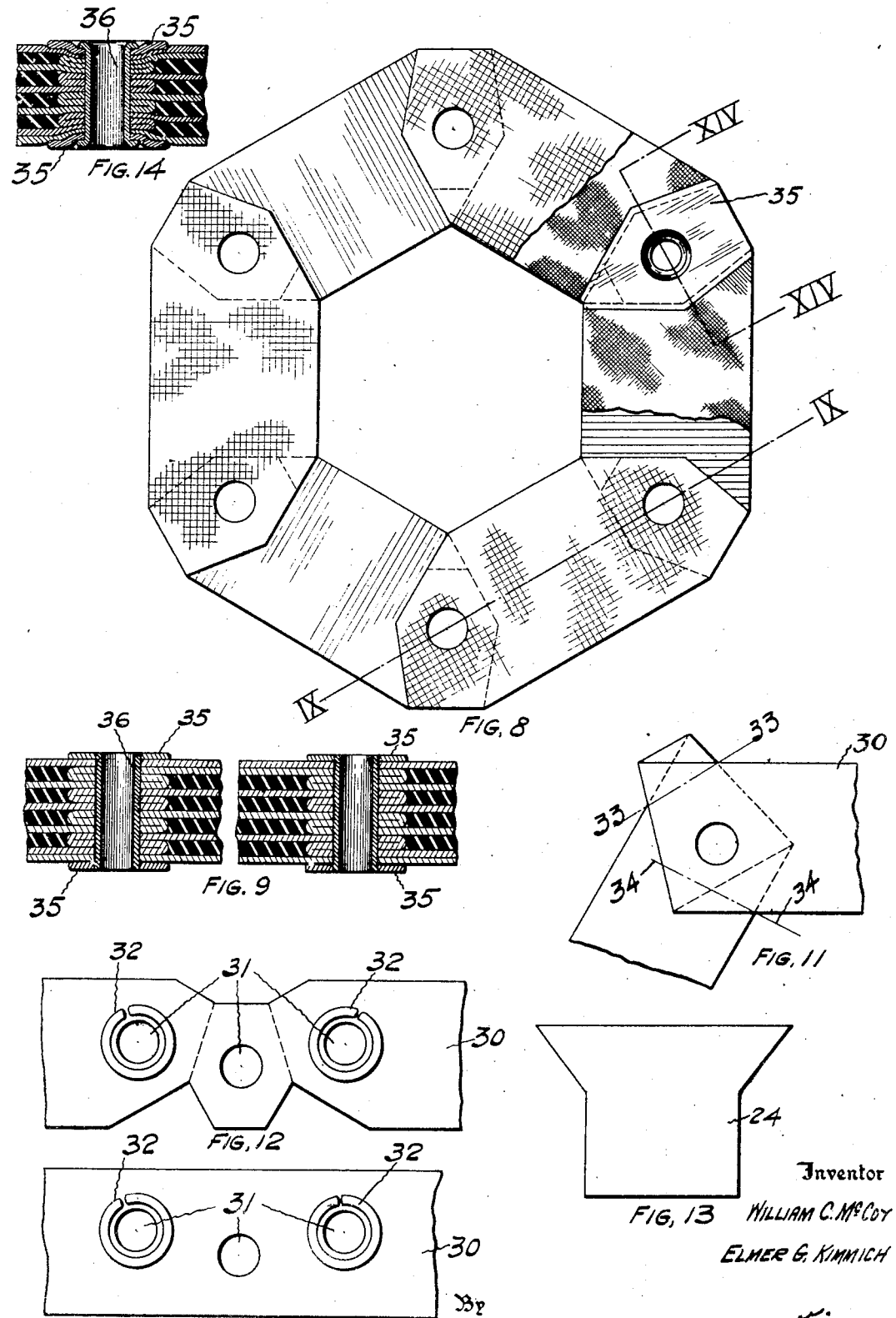

1,595,412

UNITED STATES PATENT OFFICE.

WILLIAM C. McCOY AND ELMER G. KIMMICH, OF AKRON, OHIO, ASSIGNORS TO THE GOODYEAR TIRE & RUBBER COMPANY, OF AKRON, OHIO, A CORPORATION OF OHIO.

FLEXIBLE COUPLING.

Application filed January 26, 1923. Serial No. 615,173.

Our invention relates to flexible couplings and particularly to composite fabric discs for use with flexible driving connections.

One object of our invention is to produce an inexpensive and improved disc and a novel and improved method of manufacturing such a disc.

Another object of our invention is to construct a disc of the ordinary circular or hexagonal form from a single strip of material and to so cut the material from a large sheet as to avoid all waste whatsoever in the formation of the strips from which the disc is built up.

An additional object of our invention is to provide a disc in which certain portions of the edges of the fabric strip adjacent the driving holes are folded at the periphery of the disc to provide increased driving strength and better distribution of the load stresses throughout the material of the disc.

Another object of our invention is to produce a flexible disc of the above type that shall have a zone of relatively incompressible material adjacent the driving holes of the disc, as we have hereinafter termed the holes for connecting the disc to the driving and driven spider members of the flexible coupling with which the disc is used. The disc furthermore embodies zones of greatly increased flexibility intermediate the driving holes.

An additional object of our invention is to provide improved means for anchoring the cord elements of the fabric from which the disc is made, at the driving holes and to thus insure uniform distribution of driving stresses throughout the fabric of the disc.

Other objects and advantages of our invention will be apparent from a perusal of the specification and drawings in which:

Fig. 1 is a plan view of a disc constructed in accordance with our invention showing a portion of the facing fabric lifted away;

Fig. 2 is an edge view of a portion of the disc looking in a radial direction toward one of the driving holes;

Fig. 3 is a transverse sectional view taken substantially on lines III—III of Fig. 1;

Fig. 4 is a transverse sectional view on line IV—IV of Fig. 1;

Fig. 5 is a detailed plan view of one of the strips of fabric and the rubber cushion elements that are used to build up the disc shown in Fig. 1. For convenience of illustration this figure is drawn to smaller scale than that used in Fig. 1;

Fig. 6 is an edge elevational view of the strip of fabric and the assembled cushion elements prior to its assembly into the disc shown in Fig. 3;

Fig. 7 is a plan view of a portion of a roll of fabric that is cut in accordance with the teaching of our invention prior to the building of the separate strips of fabric into discs;

Fig. 8 is a plan view, with parts lifted away, of a disc showing a modified form of our invention;

Fig. 9 is a transverse sectional view on line IX—IX of Fig. 8;

Fig. 10 is a detailed view of a portion of a strip of fabric that is used in the manufacture of the disc shown in Fig. 8;

Fig. 11 is a detailed view of a fold at one corner of the disc that is made in the strip of fabric during the construction of the disc;

Fig. 12 is a development of a portion of the strip of fabric used in the construction of the disc shown in Fig. 8 to illustrate the method of folding the fabric in the manufacture of the disc;

Fig. 13 is a plan view of one of the resilient cushions that is interposed between successive layers of fabric intermediate the adjacent driving holes of the disc; and Fig. 14 is a sectional view taken substantially on line XIV—XIV of Fig. 8.

A large sheet of calendered fabric 20, such for instance as that shown in Fig. 7, is cut into a plurality of strips 21 and punched in accordance with the showing. Each strip of fabric has a series of indentures 22 along one edge and indentures 23 along the other edge. These sets of indentures are identical and are of such form and dimension that each of the indentures 22 nests between the indentures 23 of the adjacent strip, and each of the indentures 23 nest between indentures 22 of the adjacent strip. The perfect nesting of these strips avoids all waste of the fabric except a small amount along the selvage edges of the roll.

Each of the strips 21 has a series of rubber cushions 24 mounted on each indentured projection intermediate the driving holes 25. These cushions of uncured rubber composition are of substantially the thickness of one layer of fabric and contain just enough material to fill the interstices between successive layers of fabric as later described.

A thread 26 of hard rubber compound is next laid on the fabric strip around one of each pair of driving holes in order that the layers of fabric will be cemented into a solid mass at each driving hole. Cement of hard rubber may be used in lieu of the gum thread if desired.

The disc is then built up in a mold of conventional type by placing the segments or indentures 23 on suitably arranged mold pins (not shown) and by folding each of the segments or indentures 22 over the adjacent indentures 23 substantially as shown in the completed disc of Fig. 1. A fabric facing sheet 27, a portion of which is shown torn away in Fig. 1, is applied to each side of the disc and the body disc which is then vulcanized under pressure into a composite mass.

This disc, it will be noted, is formed of one continuous strip of fabric folded into helical form with a sufficient number of turns to produce the required thickness of disc. The folds of fabric between adjacent disc segments cause the warp threads that lie in the peripheral portion of the disc to be continuous. The driving stresses are thereby transmitted directly from one segment to the adjacent flexed zone through the continuous warp cords without too localized an anchoring of the ends of the cords. This is a common fault in discs formed of separate segment links.

It will also be noted that a very solid body is provided for anchoring the driving studs to the disc without sacrificing the required flexibility of the intermediate portion of the disc. This is a very desirable element because flexible couplings as previously constructed failed in the compression zone because of intense flexing rather than in the tensioned zone of the disc.

If the disc is intended for particularly severe service a pair of washers 35 are placed on each side of the disc after it is assembled in the mold. A sleeve 36 extends between the washers 35. In making a disc of this type the mold preferably has suitable indentures formed therein to receive the washers 35 in order that uniform pressure may be applied to the entire surface of the disc during the molding or vulcanizing operation. A thread of hard rubber gum is interposed between the washer and the disc to insure the vulcanization of the washer to the face of the disc.

After the vulcanized disc is removed from the mold, the material between the washers 35 is compressed to permit the ends of the sleeve 36 to be flared to maintain the washers in position. A bushing thus inserted in the driving holes of the disc insures an absolutely uniform distribution of the driving stresses and also a secure union of the disc to the coupling.

Figs. 8 to 13 inclusive show a modification of our invention wherein the driving disc is constructed from a straight strip of fabric in lieu of the indentured strip employed in the previously described disc.

A large sheet of friction fabric is slit into a series of strips 30. Each of these strips is then passed through a machine which cuts driving holes 31 through the fabric in the particular location and arrangement shown in Fig. 10. A thread 32 of hard rubber compound is placed around each outside driving hole of each series in such manner that when the disc is folded on itself at the driving holes, the thread of hard rubber compound will rigidly unite the folds of the fabric together in the vicinity of the driving hole and will provide an extremely effective anchor for the fabric elements.

Fig. 11 shows a fold that is first made in the strip 30 after it is punched. It will be noted, however, that certain surplus materials extend beyond the sides of the disc and therefore, in some instances, it is desirable to shape the fabric strip so that it will form a fold similar in appearance to the fold shown in Fig. 8. The development of a strip thus formed is shown in Fig. 12. The pattern for this form of strip may be obtained by cutting the edge of the folded portion of the strip shown in Fig. 11 on lines 33—33 and 34—34. By thus removing a portion of the folded strip, as at 34—34, the zone occupied by the flexible cushion 24 corresponds in every particular to the similarly numbered cushions of the previously described disc, except as to their thickness, which is twice as great in this instance as in the former instance. This difference in the thickness of the flexible cushion enables a much thicker driving disc to be formed.

The sectional view shown in Fig. 9 illustrates the position of the resilient filling material that is used in this disc, and it also shows the method of folding the disc to obtain a straight line pull in the direction of the cord elements between bolt holes or in other words, to so arrange the fabric connecting links or segments between the successive bolt holes that they lie in a plane parallel to the surface of the disc. Fig. 13 illustrates one of the resilient cushions that are used in the disc shown in Figs. 8 and 12.

Although we have shown only a few modifications of our invention, it will be apparent that many other modifications could be made without departing from the spirit and scope of our invention. We desire, therefore, that only such limitations shall be imposed on our invention as are set forth in the appended claims.

What we claim is:

1. A flexible disc formed of a plurality of helical turns of an indentured strip of fabric, certain of said indentures being folded over certain other of said indentures to provide a plurality of helical turns of fabric, and a binder adapted to secure the fabric into a composite body.

2. A flexible disc formed of a strip of fabric indentured to provide lateral projecting portions, the projecting portions on one side of the strip being folded to provide a fold at each of the driving holes of the disc, and means adapted to bind the disc into a composite body.

3. A flexible disc formed of a strip of fabric indentured to provide lateral projecting portions, the projecting portions on one side of the strip being identical with the indentures of the other side and capable of nesting therewith.

4. A disc for flexible couplings comprising a composite body of vulcanized fabric and rubber composition, a driving washer vulcanized to the disc at each driving hole, and a sleeve extending between each pair of washers adapted to maintain the washers and intermediate fabric under high degree of compression.

5. The method of forming a flexible disc of vulcanized fabric and rubber composition which consists in vulcanizing a pair of washers to the disc at each driving hole, drawing the washers together and securing them in position by means of a sleeve extending therebetween subsequent to the vulcanization of the disc.

6. The method of forming a flexible disc embodying fabric and rubber which consists in placing a pair of washers at each bolt hole of the disc, vulcanizing the washers to the disc under greater pressure than is imposed over the remainder of the disc, further compressing the material of the disc between each pair of washers, and maintaining said material in said increased state of compression by means of a sleeve extending between the washers.

7. The method of forming a flexible disc which consists in folding a zigzag strip of fabric containing a binder and having projecting portions alternately formed on opposite edges of the strip in such manner that the projecting portions of one edge overlap those of the other edge to provide a polygonal disc, and curing said disc.

8. The method of forming a flexible disc which consists in cutting a plurality of nested zigzag strips from rubberized fabric, folding the projecting portions of one edge of one of the strips over the strip to cause the projections of the folded edge portion to overlap the projections of the other edge portion thereby providing a substantially flat disc of polygonal form, and vulcanizing the disc.

In witness whereof, we have hereunto signed our names.

WILLIAM C. McCOY.
ELMER G. KIMMICH.